(12) United States Patent
Cho et al.

(10) Patent No.: US 6,468,329 B2
(45) Date of Patent: *Oct. 22, 2002

(54) ADSORBENTS AND METHODS FOR THE SEPARATION OF ETHYLENE AND PROPYLENE AND/OR UNSATURATED HYDROCARBONS FROM MIXED GASES

(75) Inventors: Soon-Haeng Cho, Daejeon-Si (KR); Sang-Sup Han, Seoul (KR); Jong-Nam Kim, Daejeon-Si (KR); Kuck-Tack Chue, Daejeon-Si (KR); Venkateswarlu Choudary Nettem, Vadodara (IN); Kumar Brakash, Gujarat (IN)

(73) Assignees: Korea Institute of Energy Research (KR); Indian Petrochemcials Corporation Limited, Gujarat (IN)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,431

(22) Filed: Dec. 11, 1998

(65) Prior Publication Data

US 2002/0005118 A1 Jan. 17, 2002

(30) Foreign Application Priority Data

Jun. 29, 1998 (KR) .......................................... 98-24912

(51) Int. Cl.$^7$ .............................................. B01D 53/04
(52) U.S. Cl. ............................ 95/144; 95/900; 95/902; 502/405; 502/415
(58) Field of Search .......................... 95/143, 144, 148, 95/900, 902; 502/75, 87, 405, 415

(56) References Cited

U.S. PATENT DOCUMENTS

| | | | | |
|---|---|---|---|---|
| 2,685,607 A | * | 8/1954 | Pevere et al. | 95/144 |
| 3,232,028 A | * | 2/1966 | McDonald et al. | 95/900 X |
| 4,498,910 A | * | 2/1985 | Benkmann | 95/144 X |
| 4,546,095 A | * | 10/1985 | Hirai et al. | 95/144 X |
| 4,717,398 A | * | 1/1988 | Pearce | 95/144 X |
| 4,743,276 A | * | 5/1988 | Nishida et al. | 95/902 X |
| 4,747,855 A | * | 5/1988 | Hirai et al. | 95/144 X |
| 4,892,567 A | * | 1/1990 | Yan | 95/902 X |
| 4,917,711 A | * | 4/1990 | Xie et al. | 95/144 X |
| 4,933,159 A | * | 6/1990 | Nowack et al. | 95/900 X |
| 5,126,310 A | * | 6/1992 | Golden et al. | 95/144 X |
| 5,175,137 A | * | 12/1992 | Golden et al. | 95/144 X |
| 5,245,099 A | * | 9/1993 | Mitariten | 95/144 X |
| 5,258,571 A | * | 11/1993 | Golden et al. | 95/144 X |
| 5,451,248 A | * | 9/1995 | Sadkowski et al. | 95/144 X |
| 5,518,527 A | * | 5/1996 | Tomizuka et al. | 95/144 X |

* cited by examiner

*Primary Examiner*—Robert H. Spitzer
(74) *Attorney, Agent, or Firm*—Ladas & Parry

(57) ABSTRACT

Adsorbents useful in the selective adsorption of unsaturated hydrocarbons, the manufacture of the adsorbents, and processes for the separation of unsaturated hydrocarbons using the adsorbents.

19 Claims, 2 Drawing Sheets

ADSORBENTS AND METHODS FOR THE SEPARATION OF ETHYLENE AND PROPYLENE AND/OR UNSATURATED HYDROCARBONS FROM MIXED GASES

BACKGROUND OF THE INVENTION

1. Technical Field of the Invention

This invention relates to a new adsorbent useful in selective adsorption of unsaturated hydrocarbons, the manufacture of the adsorbent and a separating process employing the same. More specifically, this invention relates to an adsorbent having a high degree of selectivity and affinity for olefin molecules and also having high adsorption capacity for olefins, and a process for producing the same. More specifically, this invention relates to an ethylene and/or propylene separation process employing a specially prepared adsorbent to effectively separate ethylene and/or propylene from a mixed gas containing ethylene and/or propylene together with a component selected from the group consisting of $H_2$, He, $CH_4$, $C_2H_6$, $C_3H_8$ and mixtures thereof, in an efficient manner using a developed adsorbent having a high adsorptive capacity for unsaturated hydrocarbons such as ethylene and propylene.

2. Description of Related Art

Unsaturated hydrocarbons such as ethylene and propylene are basic raw materials in synthetic chemistry. These are produced by naphtha/natural gas cracking or by dehydrogenation of paraffin. Invariably these are obtained as mixtures necessitating separation before their use. Traditionally separations of ethylene from ethane and propylene from propane have been achieved by low temperature and/or high pressure distillation. These separations are highly energy intensive and difficult to achieve. Separation of mixture of ethane-ethylene is carried out by at −25° C. and 320 psig in a distillation column containing over 160 trays and propane-propylene at −30° C. and 30 psig pressure in a distillation column containing over 200 trays. It is said that separations of ethane-ethylene and propane-propylene by distillation are the largest energy consuming separation processes in petrochemical industry. Further, demand for ethylene and propylene is ever increasing.

For the past several years, various researchers have been working on the development of alternative technologies such as adsorption, chemical absorption and membrane separation processes. Of the various alternate technologies, adsorption process appears to be promising. Conventional adsorbents such as activated alumina, activated carbon, silica gel and zeolites do not show good selectivity for olefins over paraffins. Hence, development of a suitable adsorbent has become a key factor for the successful development of adsorption process.

Some of the adsorbents that have been reported for paraffin-olefin separation are crystalline CuCl; ion exchanged zeolites; polymer supported aluminum silver chloride; and copper-containing resins. Most of these adsorbents suffer from one or the other drawbacks such as slow adsorption kinetics, poor adsorption capacity, and/or selectivity. More recently Yang and Kikkinides, and CHO and coworkers have reported more promising adsorbents. Among the adsorbents reported by them, $Ag^+$ resin and $CuCl/Al_2O_3$ showed high olefin adsorption capacity and good selectivity. However, ethylene and propylene sorption kinetics on $Ag^+$ resin are slow. $CuCl/Al_2O_3$ is a CuCl dispersed on $\gamma$-$Al_2O_3$ by monolayer dispersion technique and hence, is obtained in powder form. For commercial use this adsorbent needs to be formed in to pellets which leads to reduction in adsorption capacity and selectivity. Further, adsorbent formulations prepared using Cu(I) compounds are unstable and easily get oxidized to Cu(I) leading to loss in adsorption capacity and selectivity of the adsorbent. Xie et al., have also reported a series of adsorbents containing Cu(I). These were also prepared in powder form. Hence, these adsorbents also suffer from the above mentioned drawbacks.

SUMMARY OF THE INVENTION

It has now been found that a group of solid adsorbents in the form of pellets/beads have high adsorptive capacity and selectivity for ethylene and/or propylene not known in the prior art and that they can be produced by a simple process as described below. These adsorbents comprise (i) a silver compound and (ii) a support having a sufficiently high surface area on which support said silver compound is supported. These adsorbents are highly stable and are capable of reversibly adsorbing substantial quantity of ethylene and/or propylene at room temperature. The rates of adsorption of ethylene and/or propylene are also very fast in these adsorbents.

It is an object of the present invention to provide a process for producing new highly stable solid adsorbent in pellet/bead form for selective adsorption of unsaturated hydrocarbons, which adsorbent is a composite comprising (a) a silver compound and (b) a suitable support having a sufficiently high surface area, at least a portion of said silver compound being supported by said support, and which adsorbent is obtainable by a process comprising impregnation of silver compound in a said support and heat treatment of the obtained adsorbent. Optionally the adsorbent may also contain a promoter compound.

It is another object of this invention to provide a process for the separation of ethylene and/or propylene from a mixed gas containing ethylene and/or propylene together with another component selected from such as $H_2$, He, $CH_4$, $C_2H_6$, $C_3H_8$ and mixtures thereof, which process comprises passing a stream of said mixed gas through a mass of the adsorbent at a temperature from 0° C. to 100° C. and a pressure from 1 to 100 atmospheres, and releasing the adsorbed ethylene and/or propylene by lowering pressure and/or increasing temperature.

DETAILED DESCRIPTION OF THE INVENTION

Figure 1:
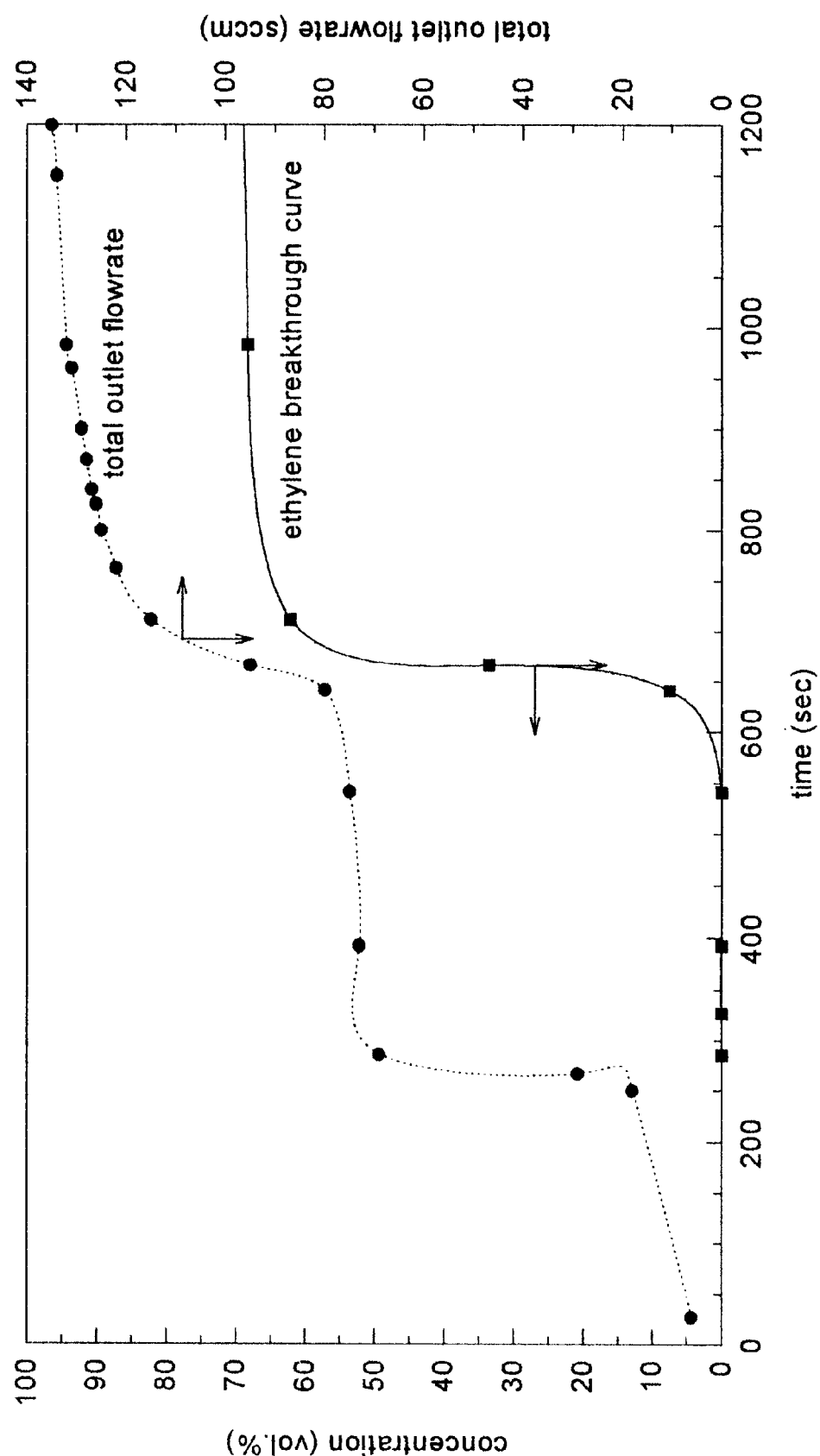
FIG. 1 shows the adsorption breakthrough curve for ethylene and ethane.

The adsorbents of this invention are obtained by dispersion of silver compound and/or a promoter on the surface of a suitable support having a high surface area by the action of a surface reaction between silver compound and the support which have been brought into contact with each other. Many silver(I) compounds or silver(II) compounds or their mixtures can be used as silver compound. When silver (II) compounds are used as silver compound, silver(II) needs to be reduced to silver(I) in a reducing atmosphere. Some of the representative examples of the silver compound which can be suitably utilized in the practice of this invention include, for example, silver nitrate, silver halides such as silver chloride, silver bromide and silver iodide, silver carboxylates such as silver formate and silver acetate, and silver oxide. Preferred silver compounds are silver nitrate and silver acetate. As promoters rare earth metallic compounds such as lanthanum compounds and cerium compounds or mixture thereof can be used. Some of the representative examples of promoter compounds are lanthanum (III) nitrate, lanthanum(III) chloride, cerium(III) chloride and cerium(III) nitrate.

As the support used to produce the adsorbents of this invention, a fairly large class of solid materials can be utilized provided that they have a sufficiently high surface area and have an affinity to the silver compound. It is desirable in the preparation of the adsorbents according to the present invention that the surface area of those materials used as a support is greater than 100 $m^2/g$, preferably greater than 400 $m^2/g$. Some representative examples of those materials that can be used as the support for the adsorbent of this invention include aluminum oxide, natural or synthetic zeolites such as zeolite A, zeolite Y, and ZSM-5, microporous aluminum phosphates, clay minerals, and the like.

In the process for the preparation of the adsorbent according to the present invention, a mixture containing the silver compound, an optional promoter, and a support is used. The above mixture can be obtained by adding to the support a solution or suspension of the silver compound in a suitable solvent and optionally promoter compound, equilibrating for a period of 0.1 to 24 hrs preferably for 1 to 4 hrs, and thereafter removing the solvent from the resultant mixture by heating and (or) purging with air/inert gas. Representative examples of the solvent that can be suitably used include, for example, water, hydrochloric acid containing aqueous solution, primary or secondary alcohols having 1 to 7 carbon atoms, acetone, ethyl acetate, hydrocarbons having 4 to 7 carbon atoms, propionitrile, and acetonitrile. The mixture can also be obtained by physically mixing silver compound and optionally promoter compound in solid form to solid support.

In the above described mixture containing the silver compound and the support, the amount of silver in the form of the compound is preferably from 1 to 150%, more preferably from 10 to 80%, by weight of the support. Thereafter, the prepared mixture containing the silver compound, optionally promoter compound, and the support is subjected to heating. The heating step can be performed at a temperature in the range of 30 to 500° C., preferably at 100 to 250° C. for a period of time from about 0.1 to about 48 hrs, preferably from about 1 to 10 hrs. The heating step can be conducted in a suitable atmosphere such as nitrogen and helium.

The adsorbents of this invention described above can be used to separate ethylene or propylene from mixed gas. The separation process comprises passing a stream of the mixed gas through an adsorber bed charged with the adsorbent(s) of the invention. The adsorbed ethylene and/or propylene can be readily desorbed either by lowering the pressure or by increasing the temperature of the adsorber bed resulting in a regenerated adsorbent. The adsorbent so regenerated can be reused as an adsorbent for the separation of ethylene and/or propylene from the mixed gases. Raw material gases wherein ethylene and/or propylene present as impurities can be purified by this separation process.

EXAMPLES

The invention is hereafter illustrated by the following examples in detail. All of the given examples are merely for the purpose of illustration and are not to be regarded as limiting the scope of the invention or the manner in which it can be practiced.

The adsorption capacity and selectivity data involved in these examples were obtained by measuring adsorption isotherms in Cahn 1100 microbalance system. In a typical adsorption isotherm measurement, a known quantity of the adsorbent was loaded in the reactor tube and activated under the flow of helium gas at 200° C. for several hours. The adsorbent was then cooled to the desired adsorption temperature under helium flow. The reactor tube was then evacuated to $10^{-4}$ mm Hg using a two stage turbo molecular pump. Isotherm was then measured by admitting pulses of pure hydrocarbon gas into the reactor tube. After each adsorption isotherm measurement, desorption experiment was also carried out to check the reversibility of the adsorption isotherm.

Example 1

Silver nitrate solution prepared by dissolving 2.014 g of silver nitrate in 2.5 ml demineralized water was thoroughly mixed with 2.0 mm diameter beads of 5.479 g of $\gamma$-$Al_2O_3$ (gama-alumina) and allowed to equilibrate for 2 hrs at room temperature. The $\gamma$-$Al_2O_3$ had a surface area of 460 $m^2/g$ and was commercially available. The solution was just enough to wet all the solid. The wet adsorbent was dried at room temperature by purging with helium gas. The resultant adsorbent was dried at 110° C. for 6 hrs followed by calcination at 250° C. for 6 hrs under helium flow. The adsorbent of 1 g adsorbed 0.76 mmol ethylene at 25° C. and 760 mm Hg pressure of ethylene within 10 min. The adsorbed ethylene was completely desorbed by evacuation at 100° C. The adsorbent was able to adsorb the same amount of ethylene under the same conditions. Under the same experimental conditions the adsorbent was able to adsorb only 0.11 mmol of ethane. The adsorption selectivity ratio of the adsorbent for ethylene to ethane was 6.9. Ethylene adsorption selectivity over ethane on the alumina support was 1.2.

Example 2

Silver nitrate solution prepared by dissolving 2.0056 g of silver nitrate in 4.5 ml demineralized water was thoroughly mixed with 2.0 mm diameter beads of 5.0054 g of $\gamma$-$Al_2O_3$ and allowed to equilibrate for 1 hr at room temperature. The $\gamma$-$Al_2O_3$ had a surface area of 460 $m^2/g$. The excess solvent was dried at room temperature by purging with helium gas. The resultant adsorbent was further dried at 110° C. for 6 hrs followed by calcination at 250° C. for 4 hrs under helium flow. The adsorbent of 1 g adsorbed 1.00 mmol ethylene at 25° C. and 760 mm Hg pressure of ethylene within 10 min. The adsorbed ethylene was completely desorbed by evacuation at 100° C. The adsorbent was able to adsorb the same amount of ethylene under the same conditions. Under the same experimental conditions the adsorbent was able to adsorb only 0.16 mmol of ethane. The adsorption selectivity ratio of the adsorbent for ethylene to ethane was 6.3. The same adsorbent after activating at 200° C. for 4 hrs adsorbed 1.22 mmol/g and 0.90 mmol/g of propylene at 760 mm Hg pressure and 25° C. and 60° C. respectively. The adsorbed propylene was completely desorbed under vacuum at 100° C. Under the same experimental conditions the adsorbent adsorbed only 0.43 mmol/g and 0.25 mmol/g of propane at 25° C. and 60° C. respectively.

Example 3

Silver nitrate solution prepared by dissolving 2.2524 g of silver nitrate in 4.2 ml demineralized water was mixed with 2.0 mm diameter beads of 5.0139 g of γ-Al$_2$O$_3$ and allowed to equilibrate for 1 hr at room temperature. The γ-Al$_2$O$_3$ had a surface area of 460 m$^2$/g. The excess solvent was dried at room temperature by purging with helium gas. The resultant adsorbent was further dried at 110° C. for 4 hrs followed by calcination at 250° C. for 6 hrs under helium flow. The adsorbent of 1 g adsorbed 0.85 mmol of ethylene at 25° C. and 760 mm Hg pressure of ethylene within 10 min. The adsorbed ethylene was completely desorbed by evacuation at 100° C. The adsorbent was able to adsorb the same amount of ethylene under the same conditions. Under the same experimental conditions the adsorbent was able to adsorb only 0.16 mmol of ethane. The adsorption selectivity ratio of the adsorbent for ethylene to ethane was 5.3.

Example 4

Silver nitrate solution prepared by dissolving 6.2152 g of silver nitrate in 5.2 ml demineralized water was thoroughly mixed with 2.0 mm diameter beads of 5.479 g of γ-Al$_2$O$_3$ and allowed to equilibrate for 2 hrs at room temperature. The γ-Al$_2$O$_3$ had a surface area of 360 m$^2$/g. The solution was just enough to wet all the solid. The wet adsorbent was dried at room temperature by purging with nitrogen for 30 min. The resultant adsorbent was further dried at 110° C. for 2 hrs followed by calcination at 250° C. for 2 hrs under nitrogen atmosphere. The adsorbent of 1 g adsorbed 0.52 mmol ethylene at 25° C. and 760 mm Hg pressure of ethylene within 10 min. The adsorbed ethylene was completely desorbed by evacuation at 100° C. The adsorbent was able to adsorb the same amount of ethylene under the same conditions. Under the same experimental conditions, the adsorbent was able to adsorb only 0.10 mmol of ethane. The adsorption selectivity ratio of the adsorbent for ethylene to ethane was 5.2.

Example 5

Silver nitrate solution prepared by dissolving 3.148 g of silver nitrate and 0.6662 g of lanthanum nitrate hexahydrate in 2.75 ml demineralized water was thoroughly mixed with 2.0 mm diameter beads of 5.0161 g of γ-Al$_2$O$_3$ and allowed to equilibrate for 2 hrs at room temperature. The γ-Al$_2$O$_3$ had a surface area of 360 m$^2$/g. The wet adsorbent was dried at room temperature by purging with helium gas for 30 min. The resultant adsorbent was further dried at 110° C. for 4 hrs followed by calcination at 350° C. for 6 hrs under helium flow. The adsorbent of 1 g adsorbed 0.57 mmol ethylene at 25° C. and 760 mm Hg pressure of ethylene within 10 min.

Example 6

Lanthanum nitrate hexahydrate solution prepared by dissolving 3.3343 g of lanthanum nitrate hexahydrate in 18 ml demineralized water was thoroughly mixed with 2.0 mm diameter beads of 30.0092 g of γ-Al$_2$O$_3$ and allowed to equilibrate for 1 hr at room temperature. The γ-Al$_2$O$_3$ had a surface area of 460 m$^2$/g. The wet adsorbent was dried at room temperature by purging with helium for 1 hr. The resultant adsorbent ethylene to ethane was 3.2.

Example 7

Silver nitrate solution prepared by dissolving 2.2540 g of silver nitrate in 4.2 ml demineralized water was thoroughly mixed with 5.0178 g of the adsorbent obtained in Example 6 and equilibrated for 1 hr. The wet adsorbent was dried at room temperature with helium purge for 30 min. The resultant adsorbent was further dried at 110° C. for 4 hrs followed by calcination at 250° C. for 6 hrs under helium atmosphere. The adsorbent of 1 g adsorbed 0.92 mmol ethylene at 25° C. and 760 mm Hg pressure of ethylene within 10 min. The adsorbed ethylene was completely desorbed by evacuation at 100° C. The adsorbent was able to adsorb the same amount of ethylene under the same conditions. The adsorption selectivity ratio of the adsorbent for ethylene to ethane was 6.4.

Example 8

Silver nitrate solution prepared by dissolving 1.4104 g of silver nitrate in 3.04 ml demineralized water was thoroughly mixed with 3.556 g of the adsorbent obtained in Example 6 and equilibrated for 1 hr. The wet adsorbent was dried at room temperature with helium purge for 30 min. The resultant adsorbent was further dried at 110° C. for 4 hrs followed by calcination at 250° C. for 6 hrs under helium atmosphere. The adsorbent of 1 g adsorbed 0.97 mmol ethylene at 25° C. and 760 mm Hg pressure of ethylene within 10 min. The adsorbed ethylene was completely desorbed by evacuation at 110° C. The adsorbent was able to adsorb the same amount of ethylene under the same conditions. The adsorption selectivity ratio of the adsorbent for ethylene to ethane was 3.2.

Example 9

1.0 g of 2.0 mm diameter beads of γ-Al$_2$O$_3$ was finely ground (100 μm) in a mortar and pestle. This powder was mixed with 0.45 g of silver nitrate and heated at 250° C. for 6 hrs in helium atmosphere. The product was adsorbent in powder form which adsorbed 0.86 mmol ethylene per gram of the adsorbent at 25° C. and 760 mm Hg pressure of ethylene within 10 min. The adsorbed ethylene was completely desorbed by evacuation at 100° C.

Example 10

Silver nitrate solution prepared by dissolving 2.0045 g of silver nitrate in 5.0 ml demineralized water was thoroughly mixed with 5–10 mesh diameter beads of 5.1054 g of silica gel and allowed to equilibrate for 1 hr at room temperature. The silica gel had a surface area of 425 m$^2$/g. The excess solvent was dried at room temperature by purging with helium gas. The resultant adsorbent was further dried at 110° C. for 6 hrs followed by calcination at 250° C. for 4 hrs under helium flow. The adsorbent of 1 g adsorbed 0.50 mmol ethylene at 25° C. and 760 mm Hg pressure of ethylene within 10 min. The adsorbed ethylene was completely desorbed by evacuation at 100° C.

Example 11

1.0 g of zeolite X was mixed with 0.45 g of silver nitrate and then heated at 250° C. for 24 hrs in helium atmosphere. The product adsorbent which adsorbed 2.5 mmol of ethylene per gram of the adsorbent at 25° C. and 760 mm Hg of ethylene. The adsorbent had ethylene selectivity ratio over ethane of 2.1.

Example 12

1.0 g of zeolite Y with Si/Al=20 was mixed with 0.5 g of silver nitrate and then heated at 250° C. for 24 hrs in helium atmosphere. The product adsorbent which adsorbed 1.8 mmol of ethylene per gram of the adsorbent at 25° C. and 760 mm Hg of ethylene. The adsorbent had ethylene selectivity ratio over ethane of 2.3.

Example 13

Silver acetate solution prepared by dissolving 2.2500 g of silver acetate in 5.0 ml demineralized water was mixed with 2.0 mm. diameter beads of 5.0036 g of $\gamma$-$Al_2O_3$ and allowed to equilibrate for 1 hr at room temperature. The $\gamma$-$Al_2O_3$ had a surface area of 460 m$^2$/g. The excess solvent was dried at room temperature by purging with helium gas. The resultant adsorbent was further dried at 110° C. for 4 hrs followed by calcination at 250° C. for 6 hrs under helium flow. The adsorbent of 1 g adsorbed 0.88 mmol of ethylene at 25° C. and 760 mm Hg pressure of ethylene within 10 min. The adsorbed ethylene was completely desorbed by evacuation at 100° C. The adsorbent was able to adsorb the same amount of ethylene under the same conditions.

Example 14

100 g of the adsorbent was prepared in the same manner as described in Example 3. 68.4 g of this adsorbent on an ambient basis was packed in a stainless steel column of 250 mm height and 20 mm diameter (78.5 ml internal volume). The adsorbent was activated at 200° C. for 3 hrs under helium flow, and then the column was filled with helium up to 770 mm Hg with temperature reduction to 24° C. Feed mixture consisting of 70.5% of ethylene and 29.5% of ethane by volume was allowed to pass through the adsorbent bed with feed flow rate of 150 sccm at 800 mm Hg. The adsorption breakthrough curve for ethylene and ethane is shown in FIG. 1. In the first 540 sec, the concentration of ethylene in the off-gas was lower than 0.01% by volume. The dynamic adsorption capacity of ethylene on the above adsorbent as obtained by breakthrough curve was 0.76 mmol/g (at 560 mm Hg). The adsorbed ethylene could be completely desorbed by evacuation to 30 mm Hg at 100° C.

Example 15

Semi-continuous adsorption-desorption cycles for said ethylene-ethane mixture were performed at 60° C. on the adsorption column described in Example 14. It was carried out in a four step semi-continuous cycle consisting of (a) ethane re-pressurization, (b) adsorption with feed, (c) ethylene rinse, and (d) vacuum desorption. The time gaps between each step were 1–5 min. Step time, flow rate and bed pressure during each step are given below:

| Step | Time/sec | Flow rate/sccm | Pressure/mmHg |
| --- | --- | --- | --- |
| Ethane re-pressurization | 35 | 250 | up to 772 |
| Adsorption | 330 | 150 | 760 to 780 |
| Ethylene rinse | 90 | 100 | 770 |
| Vacuum desorption | 480 | — | 30 |

Figure 2:
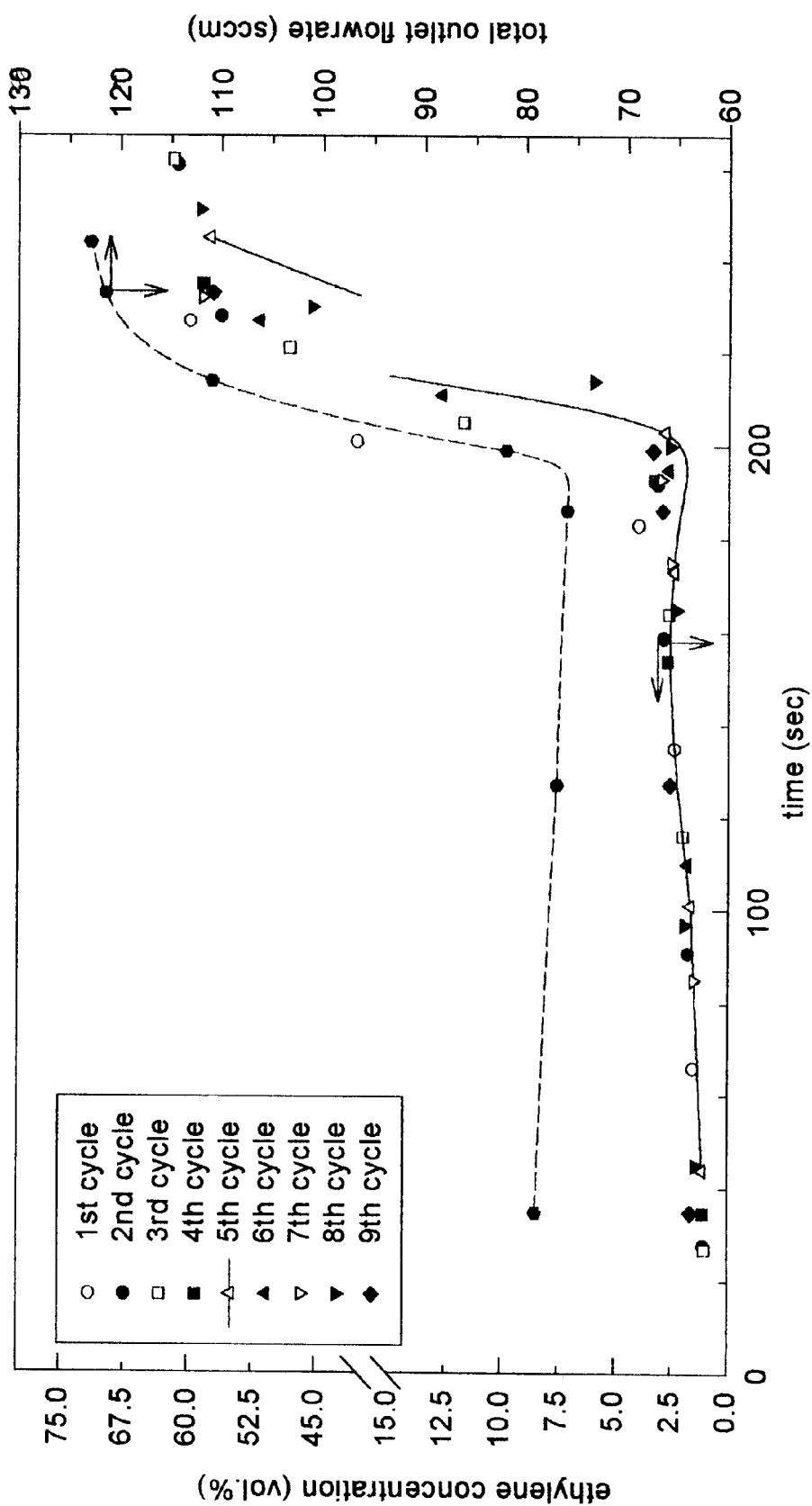
FIG. 2 shows the semi-continuous adsorption-desorption cycles for ethylene-ethane mixture.

The results are shown in FIG. 2. The data by this cyclic adsorption-desorption experiment was reproducible, which ensured the existence of steady state conditions. The purity of the effluent ethane gas was 97.5–99.0%. The breakthrough time was 220 sec compared to 540 sec of a fresh adsorbent. Purity of ethylene product obtained was at least 95%.

REFERENCES CITED

1. Keller, G. E; Marcinkowsky, A. E.; Verma, S. K.; Williamson, K. D., Olefin Recovery and Purification via Silver Complexation., *In Separation and Purification Technology*, Li, N. N., Calo, J. M., Eds., Marcel Dekker, New York, 1992.
2. Eldridge, R. B., Olefin/Paraffin Separation Technology: A Review., *Ind. Eng. Chem. Res.*, 32, 2208,1993.
3. Gilliland, E. R.; Bliss, H. L.; Kip, C. E. Reaction of Olefins with Solid Cuprous Halide, *J. Am. Chem. Soc.*, 63, 2088,1941.
4. Gilliland, E. R. Concentration of Olefins. U.S. Pat. No. 2,369,559, 1945.
5. Long, R. B. Separation of Unsaturates by Complexing with Solid Copper Salts. *In Recent Development in Separation Science*; Li, N. N. Ed., CRC Press, Cleveland, 1972.
6. Rosback, D. H., Olefin Separation Process Using Copper-Exchanged Type X Zeolites. U.S. Pate. No. 3,755,153, 1973.
7. Rosback, D. H., Adsorbing Olefins with a Copper-Exchanged Type Y Zeolite. U.S. Pat. No. 3,720,604, 1973.
8. Yang, R. T.; Kikkinides, E. S. New Sorbents for Olefin/Paraffin Separations by Adsorption via $\pi$-Complexation. *AIChE J.*, 41, 509, 1995.
9. Hirai, H.; Kurima, K.; Wada, K.; Komiyama, M., Selective Ethylene Adsorbents Composed of Copper(I) Chloride and Polystyrene Resins Having Amino Groups. *Chem. Lett.*, 1513,1985.
10. Hirai, H.; Hara, S.; Komiyama, M. Polystyrene-Supported Aluminum Silver Chloride as Selective Ethylene Adsorbent. *Angew. Makromol. Chem.*, 130, 207,1985.
11. Hirai, H., Polymer Complex for the Separation of Carbon Monoxide and Ethylene. *In Polymers for Gas Separation*; Toshima, N. Ed:, VCH Publishers Inc., New York, Chapter 7,1992.
12. Dielacher, M.; Hansen, U. Separation of Unsaturated Compounds from Liquid Hydrocarbon Mixtures Containing Same. U.S. Pat. No. 3,979,280, 1976.
13. Wu, Z.; Han, S. S.; Cho, S. H.; Kim, J. N.; Chue, K. T.; Yang, R. T., Modification of Resin-Type Adsorbents for Ethane/Ethylene Separation, *Ind Eng. Chem. Res.*, 36, 2749,1997.
14. Xie Y. C.; Tang Y. Q., Spontaneous Monolayer Dispersion of Oxides and Salts onto Surfaces of Supports: Applications to Heterogeneous Catalysis, *Advances in Catalysis*, 1, 37, 1990.
15. Xie, Y. C.; Bu, N. Y.; Liu, J.; Yang, G.; Qiu, J. G.; Yang, N. F.; Tang, Y. C., Adsorbents for Use in the Separation of Carbon Monoxide and/or Unsaturated Hydrocarbons from Mixed Gases. U.S. Pat. No. 4,917,711, 1990.

The above references are hereby incorporated by reference.

We claim:

1. An adsorbent for use in selective adsorption of unsaturated hydrocarbons or mixtures thereof from a mixed gas, said adsorbent comprising:
   (a) a suitable support having a sufficiently high surface area,
   (b) a silver compound, wherein said silver compound is selected from the group consisting of silver carboxylate, silver halide and a mixture thereof and
   (c) a promoter selected from the group consisting of lanthanum nitrate, lanthanum chloride, cerium chloride, cerium nitrate and mixtures thereof.

2. The adsorbent of claim 1 wherein said adsorbent is prepared by dissolving said silver compound in a suitable solvent, drying of excess solvent to produce a solid material, and heat treatment of the solid material.

3. The adsorbent of claim 2 wherein the solvent is selected from the group consisting of water, alcohols, hydrocarbons, and aqueous hydrochloric acid.

4. The adsorbent of claim 2 wherein said heat treatment is carried out at a temperature in the range of 30 to 350° C.

5. The adsorbent of claim 1 wherein said support is selected from the group consisting of an alumina, a zeolite and a silica gel in powder or pellet/bead form.

6. The adsorbent of claim 1 wherein said silver compound is present at from about 2% to 100% by weight of said support.

7. The adsorbent of claim 1 wherein said promoter is present at about 2% to 20% by weight of said support.

8. The adsorbent of claim 1 which adsorbs at least 0.5 mmol of ethylene or propylene per gram of adsorbent at ambient temperature and 760 mm Hg and adsorption selectively of ethylene over ethane or propylene over propane is at least 5.

9. A process for the separation of olefin molecules or mixtures thereof from a mixed gas containing olefin molecules or a mixture thereof, wherein the mixed gas comprises a component selected from the group consisting of $H_2$, He, $CH_4$, $C_2H_6$, $C_3H_8$, and mixtures thereof, wherein said process comprises:
   a) passing the mixed gas through the adsorbent of claim 1 at a temperature in the range of from 0° C. to 100° C. and a pressure in the range from 1 to 100 atmospheres, and
   b) releasing the adsorbed ethylene and/or propylene.

10. The process of claim 9 wherein the releasing is accomplished by lowering the pressure and/or heating the adsorbent.

11. An adsorbent for use in selective adsorption of unsaturated hydrocarbons or mixtures thereof from a mixed gas, said adsorbent comprising:
   (a) a suitable support having a sufficiently high surface area;
   (b) a silver (I) compound and
   (c) a rare salt metal promoter.

12. An adsorbent as claimed in claim 11 wherein said silver (I) compound is selected from the group consisting of silver carboxylates, silver halides and mixtures thereof.

13. An adsorbent as claimed in claim 11 wherein said promoter is selected from lanthanum compounds and cerium compounds.

14. A process for the separation of olefin molecules or mixtures thereof from a mixed gas containing olefin molecules or a mixture thereof, wherein the mixed gas comprises a component selected from the group consisting of $H_2$, He, $CH_4$, $C_2H_6$, $C_3H_8$, and mixtures thereof, wherein said processing comprises:
   a) passing the mixed gas through the adsorbent of claim 11 at a temperature in the range of from 0° C. to 100° C. and a pressure in the range from 1 to 100 atmospheres, and
   b) releasing the adsorbed ethylene and/or propylene.

15. A method for the manufacture of an adsorbent for use in selective adsorption of unsaturated hydrocarbons or mixtures thereof from a mixed gas, comprising
   a) providing a composition comprising a silver compound and a promoter in a suitable solvent, wherein said solvent compound is selected from the group consisting of silver carboxylate, silver halide and a mixture thereof and said promoter is selected from the group consisting of lanthanum nitrate, lanthanum chloride, cerium chloride, cerium nitrate and mixtures thereof,
   b) providing a support material having a sufficiently high surface area,
   c) impregnating said composition on said support material,
   d) drying of excess solvent to produce a solid material, and
   e) heating the solid material.

16. The method of claim 15, wherein said support material is selected from the group consisting of an alumina, a zeolite and a silica gel in powder or pellet/bead form.

17. The method of claim 15, wherein the solvent is selected from the group consisting of water, alcohols, hydrocarbons, and aqueous hydrochloric acid.

18. A method for the manufacture of an adsorbent for use in selective adsorption of unsaturated hydrocarbons or mixtures thereof from a mixed gas comprising:
   a) providing a composition of silver (I) compound and a rare earth metal promoter selected from the group consisting of lanthanum compounds and cerium compounds or mixture thereof;
   b) providing a support material having a sufficiently high surface area;
   c) impregnating said composition on said support material to produce a solid material; and
   d) heating the solid material.

19. A method of manufacture of an adsorbent as claimed in claim 18 wherein said silver (I) compound is selected for the group consisting of silver carboxylates, silver halides and mixtures thereof.

* * * * *